(12) United States Patent
Liljeblad et al.

(10) Patent No.: US 7,322,594 B2
(45) Date of Patent: Jan. 29, 2008

(54) DRAW COUPLING ARRANGEMENT

(75) Inventors: Benny Liljeblad, Lerum (SE); Hans Regnell, Ytterby (SE); Jens Gustafsson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/164,797

(22) Filed: Dec. 6, 2005

(65) Prior Publication Data

US 2006/0197309 A1    Sep. 7, 2006

Related U.S. Application Data

(63) Continuation of application No. PCT/SE2004/000747, filed on May 14, 2003, now abandoned.

(30) Foreign Application Priority Data

Jun. 6, 2003   (SE) ..................... 0301660

(51) Int. Cl.
*B60D 1/02* (2006.01)
(52) U.S. Cl. ............. 280/415.1; 280/506; 280/515
(58) Field of Classification Search ............. 280/415.1, 280/416.1, 504, 506, 515, 514
See application file for complete search history.

(56) References Cited

U.S. PATENT DOCUMENTS

| | | | | | |
|---|---|---|---|---|---|
| 2,360,335 | A | * | 10/1944 | Fink | 280/506 |
| 4,202,454 | A | * | 5/1980 | Browne et al. | 213/86 |
| 4,579,365 | A | * | 4/1986 | Breu | 280/507 |
| 5,671,938 | A | * | 9/1997 | Olson | 280/515 |
| 6,206,400 | B1 | | 3/2001 | Stech | |
| 2002/0113405 | A1 | * | 8/2002 | Moss et al. | 280/416.1 |
| 2003/0006581 | A1 | * | 1/2003 | Moss et al. | 280/416.1 |

FOREIGN PATENT DOCUMENTS

| | | | |
|---|---|---|---|
| DE | 3726823 | * | 1/1988 |
| EP | 0618093 | * | 2/1994 |

* cited by examiner

*Primary Examiner*—Anne Marie Boehler
(74) *Attorney, Agent, or Firm*—Novak Druce + Quigg, LLP

(57) ABSTRACT

A draw coupling arrangement (1) for a vehicle including a coupling jaw (2) and a coupler (4) which can be lifted by a lifting device (5). The coupler is intended for coupling together with a towing eye on a towed vehicle, and where the coupling means (4) consists of a coupling bolt with two towing sections (6a, 6b), where the towing sections (6a, 6b) have different diameters.

6 Claims, 4 Drawing Sheets

DRAW COUPLING ARRANGEMENT

CROSS-REFERENCE TO RELATED APPLICATIONS

The present application is a continuation patent application of International Application No. PCT/SE2004/000747 filed 14 May 2004 which is published in English pursuant to Article 21(2) of the Patent Cooperation Treaty, and which claims priority to Swedish Application No. 0301660-7 filed 6 Jun. 2003. Said applications are expressly incorporated herein by reference in their entireties.

FIELD OF THE INVENTION

The present invention relates to a draw coupling arrangement for coupling a vehicle together with a towed vehicle, where the coupling means of the draw coupling arrangement is adapted for coupling to towing eyes of different diameters.

BACKGROUND OF THE INVENTION

In order to couple a vehicle together with a towed vehicle, use is made of a draw coupling. The draw coupling has a coupling mouth which facilitates introduction of the towing eye into the coupling jaw of the draw coupling. The draw coupling comprises a lifting mechanism where the moving parts are located in a protected manner. A coupling bolt which can be raised and lowered by a handle is lowered through the towing eye when the towing eye is correctly positioned. Lowering of the coupling bolt can often take place automatically when the towing eye is correctly positioned in the draw coupling. This is affected, for example, using a device which releases the coupling bolt when the towing eye is correctly positioned in the draw coupling. The coupling bolt can also be pneumatically controlled, that is to say the raising and lowering are effected using compressed air.

The draw coupling is fixed in the rear crossbar of the vehicle. The towing arrangement is often provided with a mechanism which makes it possible for the towing arrangement to rotate around its center axis if the trailer should tip over. The draw coupling can also comprise a signal pin which shows that the coupling bolt has been lowered into the correct position.

The draw coupling is dimensioned for the load for which it is intended, for example for the total weight of the towed vehicle. The legal requirements of different markets also affect the dimensioning of the draw coupling. The towing section of the coupling bolt, that is to say the portion which bears against the towing eye, is designed as a slightly ball-shaped portion so as better to take up the loads which arise when the vehicle and the towed vehicle move in relation to one another. An example of a known draw coupling can be found in, for example, EP 1015262.

A problem with the draw couplings found on the market is that a draw coupling is intended for only one size of towing eye. On the market, there are a number of different standards for towing eyes and thus also for draw couplings. The most common are towing eyes with diameters of 40 mm, 50 mm and 57 mm. 40 mm is an older, European standard which is being replaced by 50 mm. 57 mm is used mainly in northern Europe. The height of the towing eyes can also vary between different types; this means that the coupling mouth of the towing arrangement is matched to one type of towing eye and that when a vehicle is to tow a towed vehicle, the driver must first check that the dimensions of the towing bolt and the towing eye are compatible. If this is not the case, either the draw coupling has to be changed, which is extremely complicated, or the towing eye on the drawbar of the towed vehicle has to be changed, which is also complicated. Moreover, the towed vehicle is type-approved together with the towing eye and drawbar, which means that it may not be permitted to change the towing eye.

The problem with differently dimensioned towing eyes renders it impossible in principle for a vehicle to be coupled to a towed vehicle which has a towing eye of a different size.

This may occur, for example, when a northern European vehicle is to tow a towed vehicle from central Europe. As the transport market is becoming increasingly deregulated and there are consequently vehicles registered in different countries on the same market, this is a growing problem.

SUMMARY OF THE INVENTION

An object of the invention is therefore to produce a draw coupling arrangement which is adapted to towing eyes of different inside diameters.

The solution affecting this object is accomplished with a draw coupling arrangement for a vehicle that comprises (includes, but is not necessarily limited to) a coupling jaw and a coupling means which can be lifted by a lifting device, where the coupling means is intended for coupling together with a towing eye on a towed vehicle. The object of the invention is achieved by virtue of the fact that the coupling means consists of a coupling bolt with two towing sections, where the towing sections have different diameters.

By means of this first embodiment of the draw coupling arrangement according to the invention, a draw coupling for a vehicle is obtained which comprises a number of different towing sections. The advantage of this is that a driver of a vehicle can in a simple way couple up to towed vehicles with different towing eyes.

In an advantageous first development (variation) of the draw coupling arrangement according to the invention, the desired towing section can be selected using a device on the lifting device. The advantage of this is that it is possible to preset the desired towing section, which simplifies the coupling of the vehicle together with a towed vehicle when towed vehicles with the same type of towing eye are used.

In an advantageous second development of the draw coupling arrangement according to the invention, the coupling bolt can be exchanged without the lifting device having to be demounted. The advantage of this is that the draw coupling arrangement can in a simple way be adapted to different types of towing eye.

In an advantageous third development of the draw coupling arrangement according to the invention, the draw coupling arrangement comprises a mechanical, pneumatic or hydraulic device which can be pressed against the towing eye when the coupling means is in its towing mode position. The advantage of this is that any play between the draw coupling arrangement and the towing eye is taken up.

BRIEF DESCRIPTION OF THE DRAWINGS

The invention will be described in greater detail below with reference to illustrative embodiments shown in the accompanying drawings, in which.

DETAILED DESCRIPTION

The illustrative embodiments of the invention with developments described below are to be seen only as examples and are in no way to be considered limiting for the scope of protection of the patent claims. In the illustrative embodiments described herein, the same reference number relates to the same type of component in the various figures. Each component is therefore not described in detail in all the illustrative embodiments.

Figure 1:
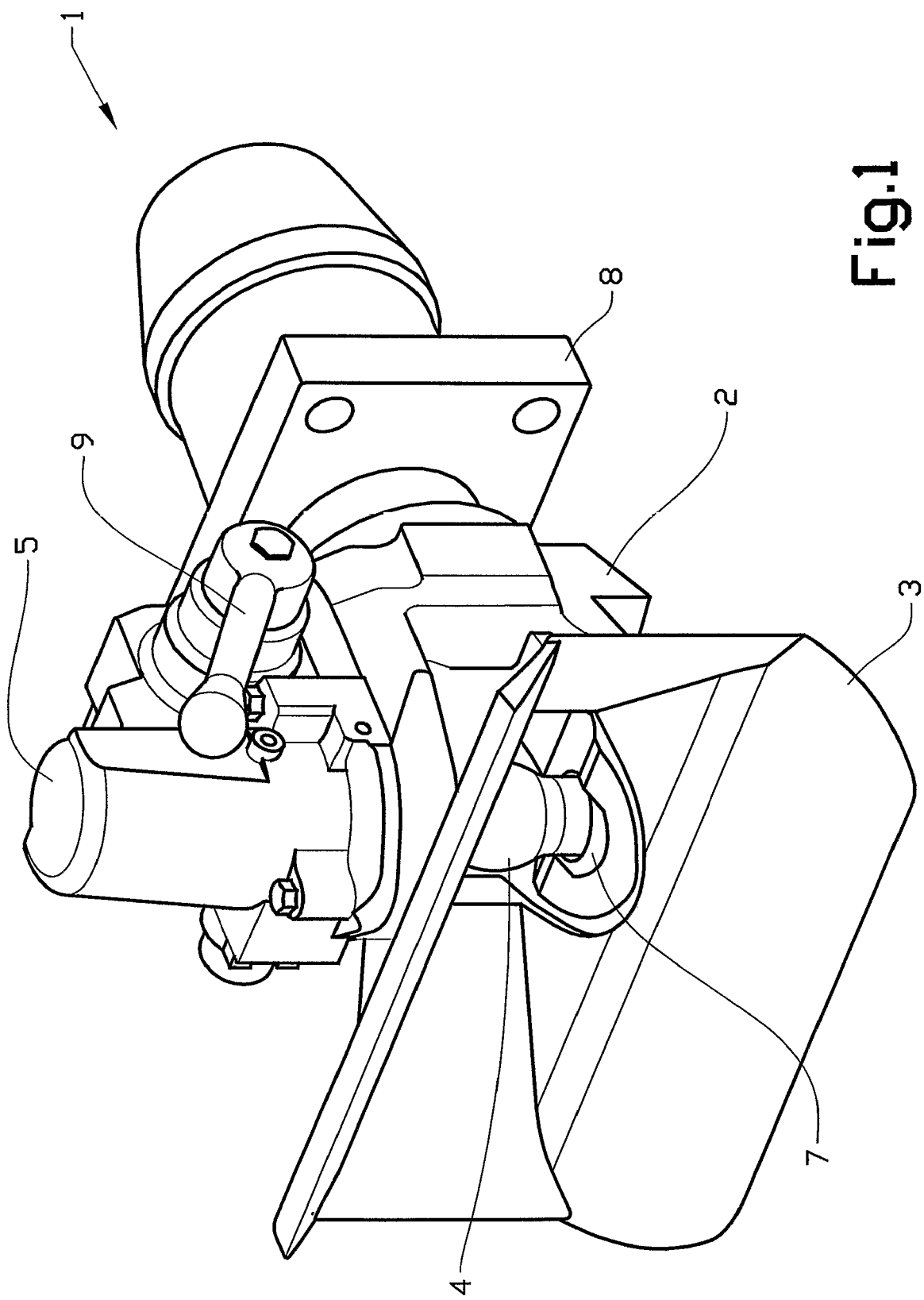
FIG. 1 is a perspective view showing a draw coupling configured according to the invention.

The draw coupling for a vehicle shown in FIG. 1 comprises essentially a coupling mouth 3, a coupling jaw 2, a drawbar sleeve 8 and a lifting device 5. The lifting device 5 comprises a coupling means 4 in the form of a coupling bolt and a handle 9. The draw coupling is also provided with a lower hole bushing 7 in which the lower part of the coupling bolt fits. The draw coupling also comprises various bolts, bushings, bearing arrangements, washers and the like that are not further described because of their familiarity to skilled persons in the relevant art.

The draw coupling is used for coupling a vehicle to a towed vehicle. The towed vehicle is equipped with a drawbar, at the end of which a towing eye is fixed. When the towed vehicle is to be coupled together with the vehicle, the coupling bolt 4 is first raised with the aid of the handle 9. The vehicle is then reversed toward the towed vehicle so that the towing eye is introduced into the coupling jaw; in this case with the aid of a coupling mouth which helps to guide the towing eye into the coupling jaw in the event of small deviations in height and lateral position between the towing eye and the coupling jaw. When the towing eye has been introduced correctly into the coupling jaw, the coupling bolt is lowered into a towing mode position, either automatically, manually or manually with the aid of compressed air.

Figure 2:
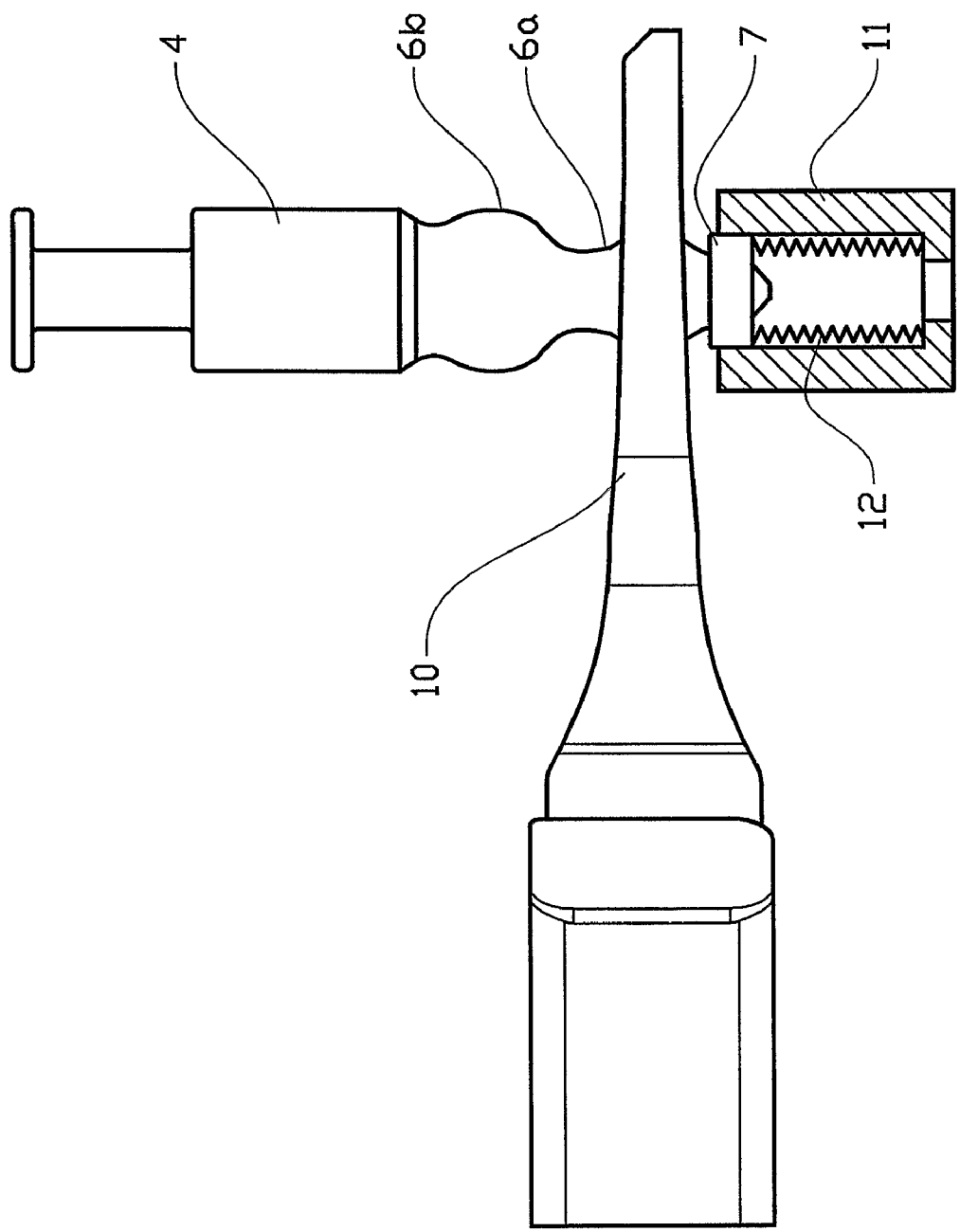
FIG. 2 diagrammatically shows a draw coupling according to the invention coupled to a first towing eye.

FIG. 2 diagrammatically shows the coupling bolt 4 for the draw coupling configured according to the invention and in which the coupling bolt 4 comprises two towing sections 6a and 6b. The coupling bolt 4 has two vertical positions: a first position in which the first towing section 6a is in towing mode position and a second position in which the second towing section 6b is in towing mode position. The first or second position is advantageously selected using the handle. When the handle is lowered, there is a built-in intermediate stop in the lifting device which causes the coupling bolt to stop in the first position so that the first towing section 6a takes up a towing mode position. When the second towing section 6b is to be used, the towing bolt 4 is lowered into the second position using the handle. In order to pass the intermediate stop, it is advantageous if an intentional action on the part of the driver is necessary. This increases safety and prevents the coupling bolt ending up in an unpermitted, intermediate position. When the draw coupling is manual, the driver must, for example, release the handle so that it can be lowered fully. The release of the handle is advantageously affected by applying an extra large force to the handle so that the intermediate stop is passed. Another way of releasing the handle so that the second position can be achieved is, for example, to press in a special locking pin which releases the handle. It is also possible to use, for example, a knob on the lifting device to select the position in which the handle is to stop and thus the towing section which is to take up the towing mode position.

When the draw coupling is pneumatically controlled, the towing section is advantageously selected using, for example, a switch in the cab. The switch then has two positions: one for the lowered coupling bolt and another for the raised coupling bolt.

The coupling bolt 4 in FIG. 2 is lowered into the first position. In this first position, the first towing section 6a of the coupling bolt is in towing mode position so that the first towing section 6a can be coupled to a first towing eye 10. The first towing eye 10 has an inside diameter which corresponds to the 50 mm standard, for example. The diameter of the first towing section 6a of the coupling bolt can then be 49 mm, for example.

As the draw coupling arrangement according to the invention has two towing mode positions, the lower hole bush 7 is mounted resiliently in a bush sleeve 11, where a spring 12 holds the lower hole bush 7 loaded against the coupling bolt 4.

Figure 3:
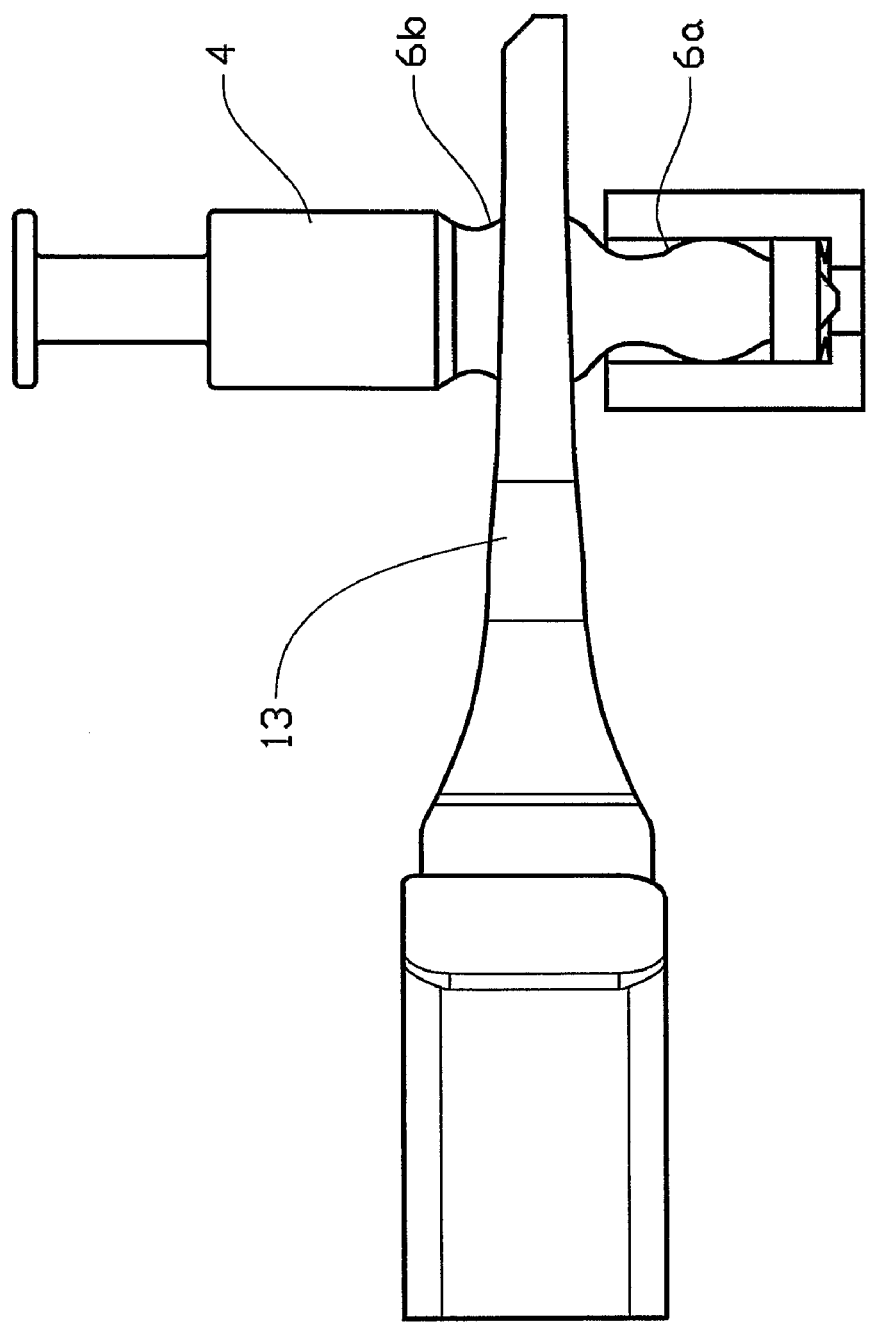
FIG. 3 diagrammatically shows a draw coupling according to the invention coupled to a second towing eye.

FIG. 3 diagrammatically shows the coupling bolt for the draw coupling according to the invention, where the coupling bolt is coupled to a second towing eye 13. In this case, the second towing section 6b of the coupling bolt 4 is coupled to the towing eye 13. The second towing eye 13 has an inside diameter which corresponds to the 57 mm standard, for example. The diameter of the coupling bolt can then be 56 mm, for example. In this case, the lower hole bush 7 is moved resiliently down into the bush sleeve 11. The inside diameter in the bush sleeve 11 is advantageously adapted to the first towing section 6a of the coupling bolt, so that the first towing section 6a of the coupling bolt also serves as a stay against the lower hole bush.

This is advantageous as a towing arrangement with a smaller diameter, such as the first towing eye 10, is approved for lower loads than a towing arrangement with a larger diameter, such as the second towing eye 13. The stay therefore has to be stronger when the second towing eye 13 is used. By combining the lower hole bush 7 with the first towing section 6a of the coupling bolt, a stay is obtained which is capable of standing up to the higher load for which the second towing section of the coupling bolt is approved.

In order that it is not possible for a towing eye with a larger inside diameter to be coupled to a towing bolt with a smaller diameter, the towing eyes are also provided with different height and outside diameter. This coding is used so that it is not possible for unpermitted combinations to be coupled together. The towing arrangement is therefore made with dimensions corresponding to or exceeding the towing eye which has the highest profile and the towing eye which has the largest outside diameter. In this way, all towing eyes will fit in the towing arrangement. In order that play does not arise between the towing eye and the towing arrangement, it is advantageous to provide the towing eye with an adapter which adapts the towing eye to the towing arrangement before coupling together takes place.

Figure 4:
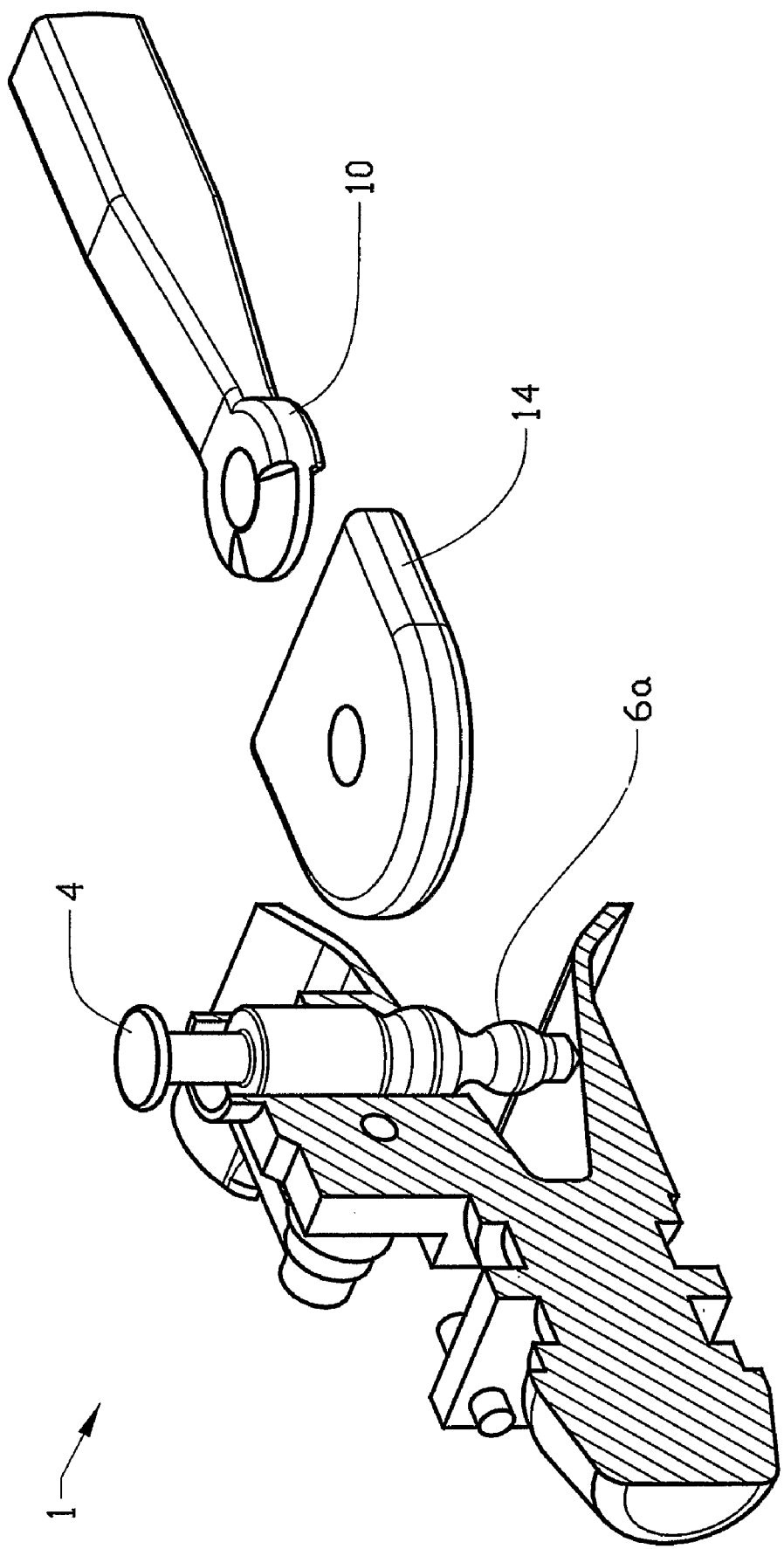
FIG. 4 diagrammatically shows an adapter for adapting a towing eye to a draw coupling according to the invention.

An embodiment of an adapter 14 is shown in FIG. 4. The adapter shown is adapted to fit on the first towing eye 10 shown in FIG. 2. This adapter is preferably made of metal but a reinforced composite plastic is also possible. As all the force between the vehicle and the towed vehicle is transmitted between the towing section of the towing bolt and the inner contact surface of the towing eye, the main task of the adapter is to prevent play between the towing arrangement and the outer surfaces of the towing eye. It is advantageous to provide an adapter for each type of towing eye; that is to say, each adapter has the same outside dimensions but the inside dimensions are matched to the various towing eyes. In this way, a driver can easily adapt a towing eye to the towing arrangement.

In a first development of the draw coupling arrangement according to the invention, the towing arrangement comprises a hydraulic device, for example in the upper or lower part of the coupling jaw and/or in the rear edge of the coupling jaw, which takes up any play between the towing arrangement and the towing eye after the coupling bolt has been lowered. This is affected by virtue of the hydraulic device being pressurized when the coupling bolt is lowered. This pressure presses the device against the towing eye, in the vertical and/or the horizontal direction, any play being taken up. For example, the hydraulic device can press the lower hole bush against the towing eye. The same function can also be obtained using a pneumatic device. Similar hydraulic devices for compensating for play in a towing arrangement are known to the skilled person and are not described further. It is also possible to use a mechanical device, which is, for example, spring-loaded, to press the device against the towing eye so that play is taken up. In this way, the towing arrangement can be adapted to towing eyes of different outside diameters.

In a second development of the draw coupling arrangement according to the invention, the coupling bolt is exchangeable. This makes it possible for a driver to adapt the draw coupling to any type of towed vehicle. For example, a driver can adapt the towing arrangement for southern Europe by mounting a coupling bolt intended for 50 mm and 40 mm. When the driver comes to the Nordic countries, the coupling bolt can be exchanged for a coupling bolt intended for 57 mm and 50 mm. It is also possible to offer coupling bolts with only one towing section if desired, for example when a vehicle is converted for a special purpose.

The lifting device is advantageously designed so as to make it possible to exchange a coupling bolt in a simple way. For example, a protective cover on top of the lifting device can be undone and the handle can be guided past its top position into a service position in which the coupling bolt is freed from the lifting device so that the coupling bolt can be exchanged simply.

In a third development of the draw coupling arrangement according to the invention, the coupling bolt is provided with three towing sections. In this development, the lifting device is also adapted so that one of the three towing sections can be selected in a simple way. For example, the desired towing section is selected using a rotary control or a lever control.

The invention is not to be regarded as being limited to the illustrative embodiments described above, but a number of further variants and modifications are possible within the scope of the patent claims. The draw coupling can, for example, also be used for other types of coupling when vehicles with differently dimensioned towing arrangements are to be coupled together.

What is claimed is:

1. A draw coupling arrangement (1) for a vehicle, said arrangement comprising: a coupling jaw (2) and a coupling means (4) liftable by a lifting device (5), said coupling means (4) is configured for coupling together with a towing eye on a towed vehicle and comprises a coupling bolt having two vertical towing mode positions associated with two towing sections (6a, 6b) having different diameters;

wherein said towing eye has a diameter to receive at least one of said two towing sections that include a first towing section and a second towing section, said first towing section having a diameter smaller than that of said second towing section;

wherein said coupling means provides coupling of said draw coupling to a first towing eye having a first diameter and a second towing eye having a second diameter that is larger than said first diameter; and wherein the coupling jaw includes a bush sleeve (11) containing a lower hole bushing (7) into which a lower part of said coupling bolt fits, said bush sleeve (11) sized to receive said first towing section of said coupling bolt, said lower hole bushing (7) having adjustment between a first height corresponding to a first towing mode position and a second height corresponding to a second towing mode position.

2. The draw coupling arrangement as recited in claim 1, wherein said first towing mode position places said first towing section in said first towing eye of a first draw bar.

3. The draw coupling arrangement as recited in claim 1, wherein said second towing mode position places said second towing section in said second towing eye of a second draw bar.

4. A draw coupling arrangement (1) adapted for attachment of draw bars of a towed vehicle to a towing vehicle, said draw bars having towing eyes of differing diameters, said arrangement comprising:

a coupling jaw (2) and a coupling means (4) liftable by a lifting device (5), said coupling means (4) configured for coupling together with at least one of said towing eyes, said coupling means comprising a coupling bolt having a first towing section and a second towing section, said first towing section having a diameter smaller than that of said second towing section wherein said coupling jaw includes a bush sleeve (11) containing a lower hole bushing (7) into which a lower part of said coupling bolt fits, said bush sleeve (11) sized to receive said first towing section of said coupling bolt, said lower hole bushing (7) having adjustment between a first height corresponding to a first towing mode position and a second height corresponding to a second towing mode position.

5. A method for attaching drawbars of a towed vehicle to a towing vehicle, said drawbars having towing eyes of differing diameters, said method comprising:

providing a draw coupling arrangement including a coupling jaw (2) and a coupling means (4) liftable by a lifting device (5), said coupling means (4) configured for coupling together with at least one of said towing eyes, said coupling means comprising a coupling bolt having a first towing section and a second towing section, said first towing section having a diameter smaller than that of said second towing section wherein said coupling jaw includes a bush sleeve (11) containing a lower hole bushing (7) into which a lower part of said coupling bolt fits, said bush sleeve (11) sized to receive said first towing section of said coupling bolt, said lower hole bushing (7) having adjustment between a first height corresponding to a first towing mode position and a second height corresponding to a second towing mode position;

raising said coupling bolt to open said coupling jaw (2) to receive a one of said drawbars;

inserting said one of said drawbars into said coupling jaw (2) said one of said drawbars including a one of said towing eyes; and lowering said coupling bolt into said one of said towing eyes to place said draw coupling arrangement in said first towing mode position with said first towing section occupying said one of said towing eyes, said lower hole bushing being at said first height.

6. The method as recited in claim 5, wherein lowering said coupling bolt places said draw coupling arrangement in said second towing mode position with said second towing section occupying said one of said towing eyes, said lower hole bushing being at said second height, said one of said towing eyes in said second towing mode position having a larger diameter than said one of said towing eyes of said one of said drawbars in said first towing mode position.

* * * * *